US007457587B2

(12) United States Patent
Chung

(10) Patent No.: US 7,457,587 B2
(45) Date of Patent: Nov. 25, 2008

(54) METHOD AND APPARATUS FOR FORMING ARRAY ANTENNA BEAM OF MOBILE TERMINAL

(75) Inventor: Hee-Sok Chung, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 10/932,145

(22) Filed: Sep. 2, 2004

(65) Prior Publication Data

US 2005/0048921 A1 Mar. 3, 2005

(30) Foreign Application Priority Data

Sep. 3, 2003 (KR) ..................... 10-2003-0061438

(51) Int. Cl.
*H04B 1/10* (2006.01)
*H04B 15/00* (2006.01)

(52) U.S. Cl. ................ 455/63.4; 455/562.1; 455/575.7; 455/101; 455/277.2; 455/278.1; 455/63.1; 343/702; 343/757; 343/815; 343/893

(58) Field of Classification Search ................ 455/63.4, 455/575.7, 562.1, 25, 277.2; 342/81, 157, 342/357; 343/893, 865, 702, 757
See application file for complete search history.

(56) References Cited

U.S. PATENT DOCUMENTS

| | | | | |
|---|---|---|---|---|
| 6,236,849 | B1 * | 5/2001 | Reudink et al. | 455/342 |
| 6,369,770 | B1 * | 4/2002 | Gothard et al. | 343/794 |
| 6,463,303 | B1 * | 10/2002 | Zhao | 455/562.1 |
| 6,509,865 | B2 * | 1/2003 | Takai | 342/158 |
| 6,694,154 | B1 * | 2/2004 | Molnar et al. | 455/562.1 |
| 6,768,913 | B1 * | 7/2004 | Molnar et al. | 455/562.1 |
| 6,917,337 | B2 * | 7/2005 | Iida et al. | 343/702 |
| 7,013,165 | B2 * | 3/2006 | Yoon et al. | 455/561 |
| 7,071,874 | B2 * | 7/2006 | Doi | 342/377 |
| 7,072,692 | B1 * | 7/2006 | Katz et al. | 455/562.1 |
| 7,088,956 | B2 * | 8/2006 | Kishigami et al. | 455/65 |
| 7,149,548 | B2 * | 12/2006 | Mori et al. | 455/562.1 |
| 7,151,951 | B2 * | 12/2006 | Goransson et al. | 455/562.1 |
| 7,242,964 | B1 * | 7/2007 | Aiken et al. | 455/561 |
| 7,289,834 | B2 * | 10/2007 | Sun et al. | 455/575.5 |
| 2002/0115474 | A1 * | 8/2002 | Yoshino et al. | 455/562 |

FOREIGN PATENT DOCUMENTS

KR 2001-0015259 2/2001

* cited by examiner

*Primary Examiner*—Marceau Milord
(74) *Attorney, Agent, or Firm*—Ked & Associates, LLP

(57) ABSTRACT

A method for forming an array antenna beam of a mobile terminal periodically compares transmit/receive characteristics of a three-dimensional adaptive beam with transmit/receive characteristics of an omnidirectional beam periodically. A beam direction having better transmit/receive characteristics is then selected. By horizontally rotating an array antenna beam toward up or down at an angle of 360° degrees, a direction having a maximum signal receiving value is searched, and a three-dimensional adaptive beam is set in the searched direction. By using position information of a mobile terminal together with the detected information, a beam direction is set. And, by comparing beam direction information set toward a maximum signal receiving direction with beam direction information set on the basis of position information of a base station/mobile terminal, an optimum beam is selected and formed, thereby improving transmit/receive characteristics of the mobile terminal.

25 Claims, 8 Drawing Sheets

METHOD AND APPARATUS FOR FORMING ARRAY ANTENNA BEAM OF MOBILE TERMINAL

BACKGROUND OF THE INVENTION

1. Field of the Invention

The present invention relates to a method and apparatus for forming an array antenna beam of a mobile terminal.

2. Background of the Related Art

With the rapid increase of wireless mobile communication subscribers, research on increasing subscribers under limited frequency channel capacity has been a major interest both at home and abroad. Particularly, by applying an array antenna to a mobile communication system, frequency can be directionally transmitted/received according to a spatial distribution of users, and accordingly power efficiency can be improved and interference can be reduced. Therefore, significant research on applying an array antenna to a mobile communication system has been conducted in order to develop an effective method for increasing terminal acceptance range per base station and subscriber capacity.

According to one method for forming an array antenna beam of a mobile terminal, a two-dimensional beam pattern is formed in a direction in which the amplitude of a signal received from a pertinent base station is the largest. More specifically, the two-dimensional beam pattern by adjusting a phase of an array antenna only with an amplitude of a signal received from a base station.

This method has proven to have significant drawbacks, not the least of which is that the accuracy of the beam pattern of the mobile terminal may be lowered in a multipath area such as a downtown area of a city. As a result, it may be difficult to improve the transmit/receive characteristics of a mobile terminal under these conditions.

SUMMARY OF THE INVENTION

An object of the invention is to solve at least the above problems and/or disadvantages and to provide at least the advantages described hereinafter.

It is another object of the present invention to provide a method and apparatus for forming an array antenna beam of a mobile terminal which improves transmit/receive characteristics of the terminal in a multipath area.

It is another object of the present invention to provide a method and apparatus for forming an array antenna beam of a mobile terminal which forms a three-dimensional beam toward a direction in which a signal source exists by using a reduced number of antennas.

It is another object of the present invention to provide a method and apparatus for forming an array antenna beam of a mobile terminal which forms a beam using not only amplitude information of a signal received from a pertinent base station but also position information of the base station and mobile terminal.

In order to achieve the above-mentioned objects and advantages, the present invention provides a method for forming an array antenna beam of a mobile terminal comprising comparing direction information of a first beam set toward a maximum signal receiving direction with direction information of a second beam set by using position information of a base station and a mobile terminal; and selecting optimum beam direction information between the first and second beam direction information on the basis of variation degree of the first beam direction information when the first beam direction information is not the same with the second beam direction information. Direction information of the first beam preferably indicates direction information of a beam having better transmit/receive characteristics between transmit/receive characteristics of a three-dimensional adaptive beam and transmit/receive characteristics of an omnidirectional beam.

In accordance with another embodiment, the present invention provides, a method for forming an array antenna beam of a mobile terminal comprising comparing transmit/receive characteristics of a three-dimensional adaptive beam with transmit/receive characteristics of an omnidirectional beam periodically; forming an omnidirectional beam when transmit/receive characteristics of the three-dimensional adaptive beam are not better than transmit/receive characteristics of the omnidirectional beam; and forming a three-dimensional adaptive beam when transmit/receive characteristics of the third adaptive beam are better than transmit/receive characteristics of the omnidirectional beam.

In accordance with another embodiment, the present invention provides, an apparatus for forming an array antenna beam of a mobile terminal in accordance with the present invention includes an array antenna; a modem for setting a beam pattern toward a maximum three-dimensional signal receiving direction, setting a beam pattern on the basis of position information of a base station and a mobile terminal and selecting an optimum beam pattern by comparing beam direction information set on the basis of the position information with beam direction information set in the maximum signal receiving direction; an array antenna beam controller/switch for forming a beam pattern set in the modem by adjusting phase of the array antenna; and a RF unit for processing a RF (radio frequency) signal received through the array antenna beam controller/switch.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

Figure 1:
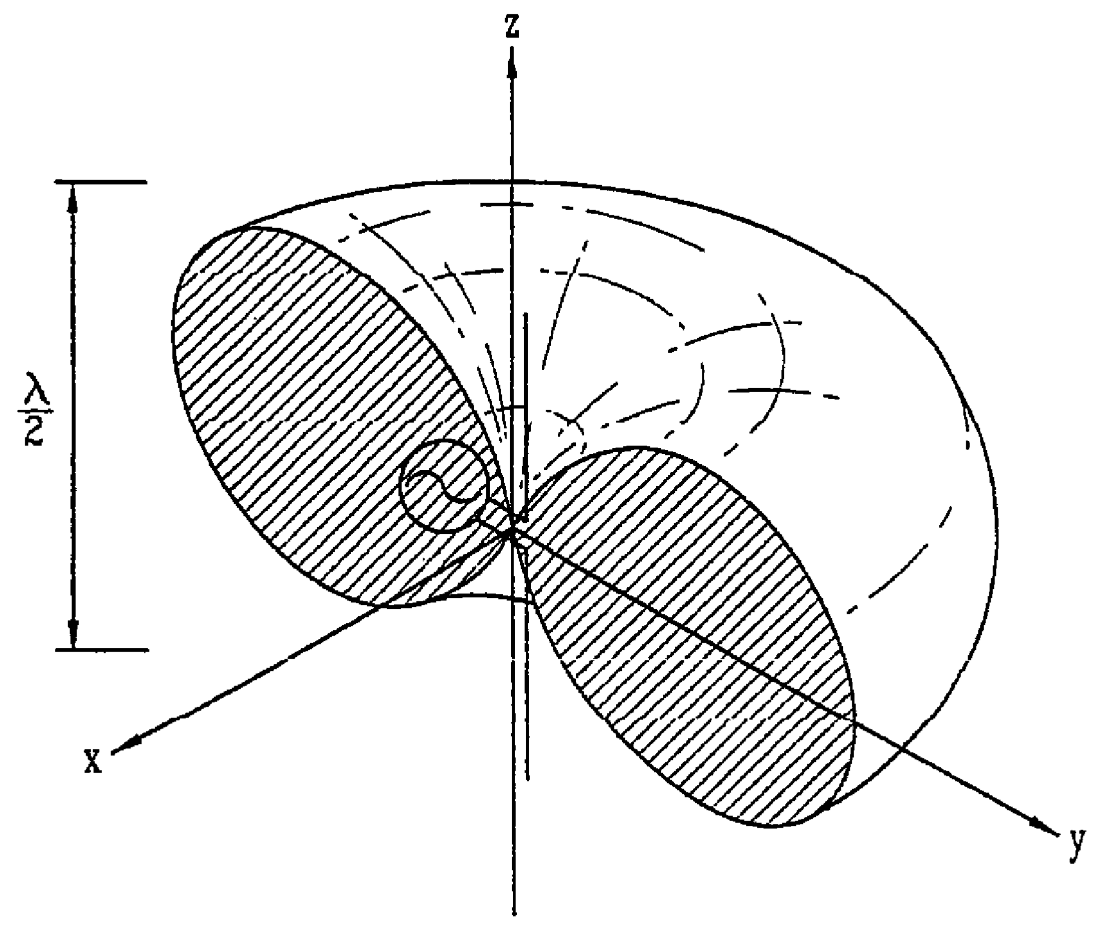
FIG. 1 illustrates a structure of a half-wavelength di-pole antenna and whole beam pattern of the half-wavelength di-pole antenna.
Figure 2A:
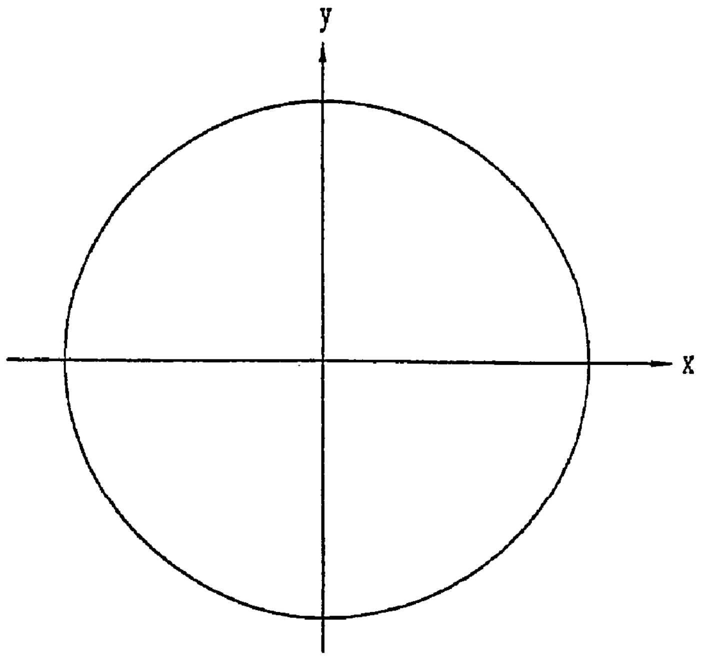
FIG. 2A illustrates a directivity at a plane parallel to an element of the half-wavelength di-pole antenna.
Figure 2B:
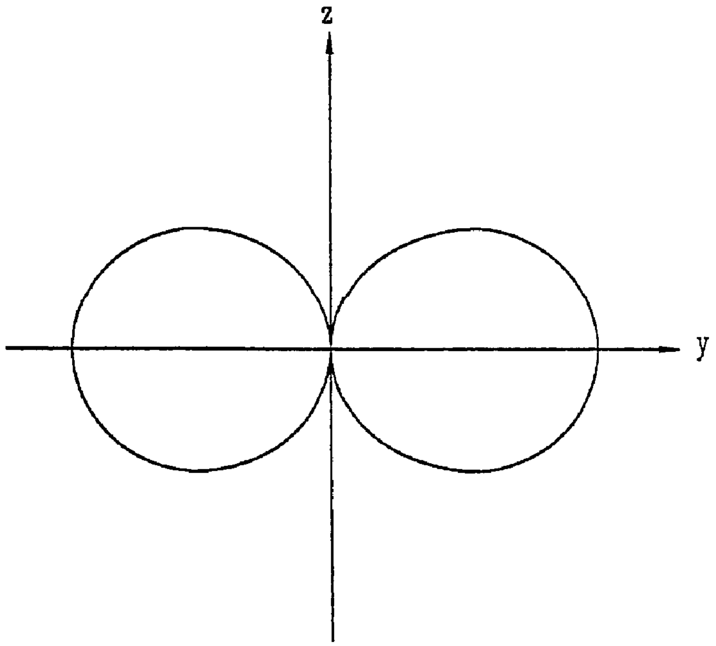
FIG. 2B illustrates a directivity of the half-wavelength di-pole antenna at an y-z plane.

A half-wavelength ($\lambda/2$) di-pole antenna is a general basic antenna. As shown in FIG. 1, a coaxial cable is connected at the center of two wires of equal length and the total length of two wires of the half-wavelength di-pole antenna is a half of a wavelength of the frequency of operation. A directivity at a plane parallel to an element of the di-pole antenna, namely, at an x-y plane, has a circular shape as shown in FIG. 2A, and a directivity at a y-z plane has a figure-8 shape as shown in FIG. 2B. A directivity in the direction perpendicular to the element of the di-polar antenna, namely, in the 'z' axis direction, is non-directional.

Figure 3:
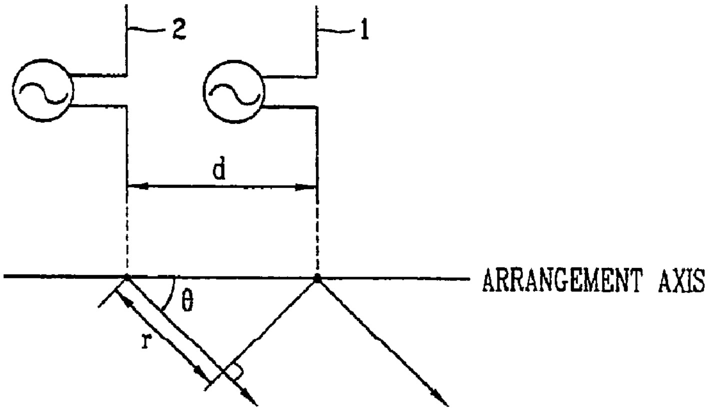
FIG. 3 illustrates a structure of two half-wavelength di-pole antennas arranged on the arrangement axis.

Referring to FIG. 3, beam formation in case that two half-wavelength di-pole antennas are arranged at a certain predetermined interval on an arrangement axis. More specifically, a first half-wavelength di-pole antenna 1 and a second half-wavelength di-pole antenna 2 are feed at the same phase and with the same amplitude, and the first and second half-wavelength di-pole antennas are separated by a distance "d." If a signal source exists in the direction θ from the arrangement axis, a signal according to the second half-wavelength di-pole antenna has a phase delay corresponding to a distance 'r' compared to a signal according to the first half-wavelength di-pole antenna in calculating a composite field with respect to the signal source.

Figure 4:
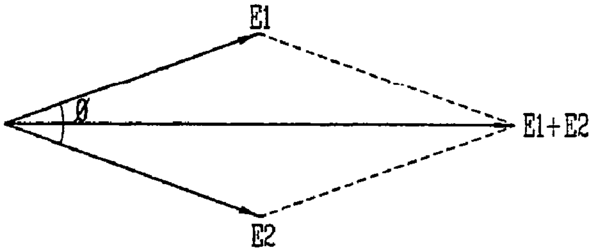
FIG. 4 illustrates a sum of electric field of two half-wavelength di-pole antennas arranged on the arrangement axis.

The sum of electric field (composite field) of the first and second half-wavelength di-pole antennas 1 and 2 is calculated by the vector sum shown in FIG. 4, which is the sum of a field of the first half-wavelength di-pole antenna (E1, the first field vector) and a field of the second half-wavelength di-pole antenna (E2, the second field vector).

When an angle between the first field vector (E1) and the second field vector (E2) is ϕ, ϕ can be expressed by formula (1) and the distance 'r' can be expressed by formula (2) shown below:

$$\phi=2\pi r/\lambda \quad (1)$$

$$r=d\cdot\cos\theta \quad (2)$$

Thus, ϕ can be expressed by formula (3) shown below:

$$\phi=2\pi\cdot d\cdot\cos\theta/\lambda \quad (3)$$

At this time, if $d=\lambda/2$, ϕ can be expressed by formula (4) shown below:

$$\phi=\pi\cdot\cos\theta \quad (4)$$

Accordingly, if $\theta=\pi/2$, $\phi=0$ by formula (4). More specifically, if a signal source exists in-phase in the direction perpendicular to the arrangement axis of the first and second half-wavelength di-pole antennas 1 and 2, the composite field (E1+E2) is maximized.

Figure 5:
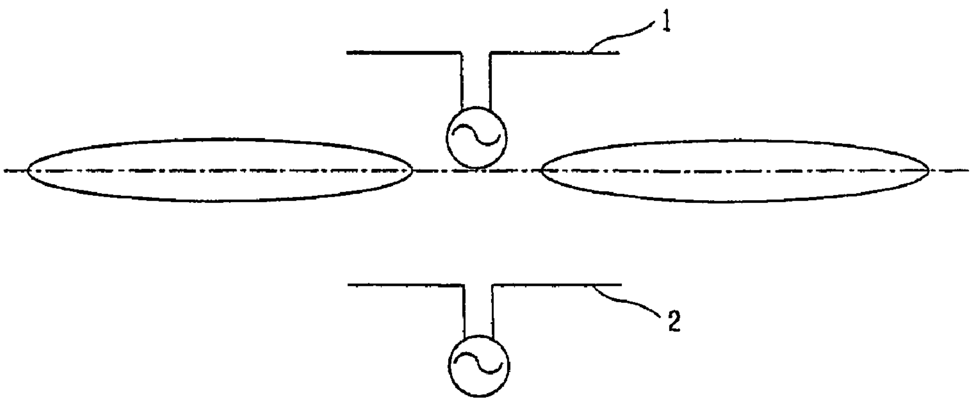
FIG. 5 illustrates a composite beam pattern of two half-wavelength di-pole antennas arranged on the arrangement axis.

If $\theta=0°$, $\phi=\pi$ (radian). That is, in the case that the signal source exists anti-phase on the arrangement axis of the first and second half-wavelength di-pole antennas 1 and 2, the composite field (E1+E2) becomes 0. Accordingly, the composite beam pattern of the first and second half-wavelength di-pole antennas 1 and 2 has directivity in the direction perpendicular to the arrangement axis as shown in FIG. 5.

The larger the number of antennas in the array, the greater the directivity or directivity control. The beam pattern of the array antenna changes according to arrangement of the half-wavelength di-pole antennas feed at the in-phase with the same amplitude. Herein, though the beam pattern of the array antenna including the half-wavelength di-pole antennas, a wavelength/4 monopole antenna is also likewise, and its description is thus omitted.

Figure 6:
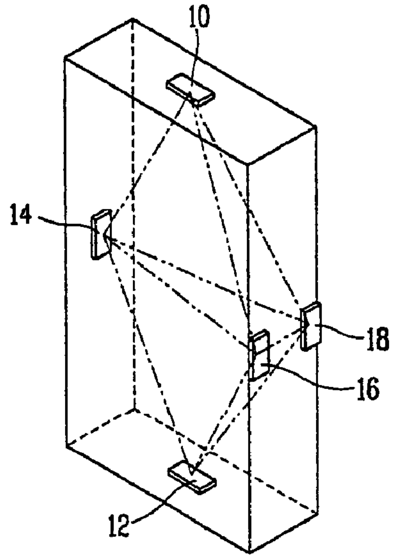
FIG. 6 illustrates a structure of an antenna array of a mobile terminal.

In accordance with at least one embodiment of the present invention, an antenna array capable of forming a 3-dimensional beam is constructed with a smaller number of half-wavelength di-pole antennas or wavelength/4 monopole antenna. Referring to FIG. 6, in the array antenna used for a mobile terminal in this embodiment, five half-wavelength di-pole antennas 10-18 are disposed to form a three-dimensional cube. More specifically, one half-wavelength di-pole antenna 10 is positioned at an upper portion of the mobile terminal, one di-pole antenna 12 at a lower portion thereof, and three di-pole antennas 14, 16 and 18 at the central portions thereof. Preferably, the three half-wavelength di-pole antennas 14, 16 and 18 positioned at the central portions of the mobile terminal maintain equal intervals, thereby forming an isosceles triangle. If desired, the half-wavelength di-pole antennas can be replaced with wavelength/4 monopole antennas.

Figure 7:
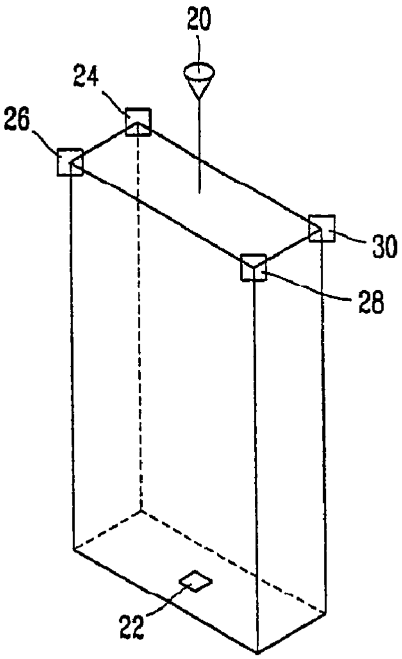
FIG. 7 illustrates another structure of an antenna array of a mobile terminal.

In addition, as depicted in FIG. 7, an array antenna of the mobile terminal can be constructed with one omnidirectional antenna 20 and multiple half-wavelength di-pole antennas 22~30, e.g., five half-wavelength di-pole antennas. The omnidirectional antenna 20 preferably includes a load antenna. The five half-wavelength di-pole antennas 22~30 maybe arranged in a reversed rectangular-horn shape, and the omnidirectional antenna 20 maybe positioned at the center of rectangular surfaces including four half-wavelength di-pole antennas 24, 26, 28 and 30. The four half-wavelength di-pole antennas preferably make square faces each other. Other arrangements and geometries may also be used depending, for example, on the intended application and/or desired performance requirements. The half-wavelength di-pole antennas 22-30 can be substituted with wavelength/4 monopole antennas.

The array antenna of the present invention can have various forms without being limited to the array antenna form shown in FIGS. 6 and 7, but it is preferable to have a form that can form a three-dimensional beam with the smaller number of antennas.

Figure 8:
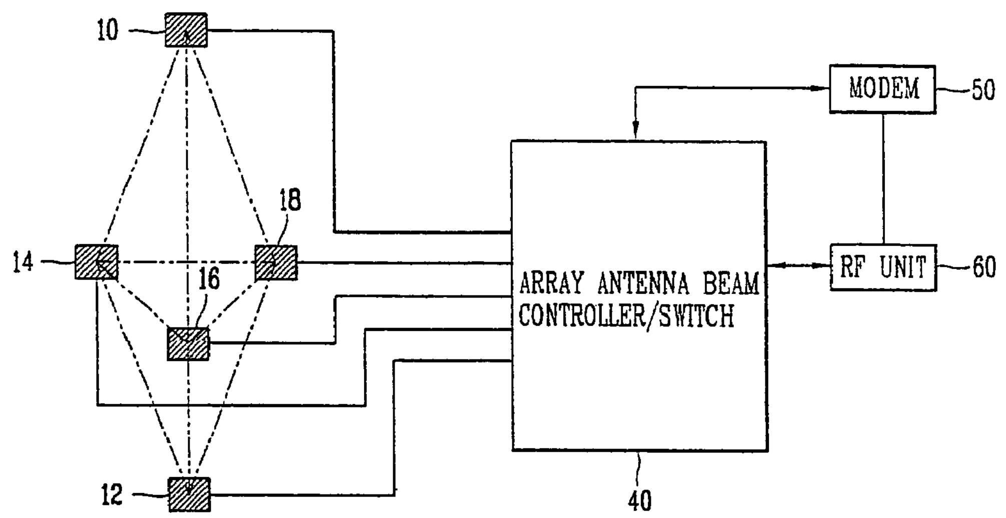
FIG. 8 is a block diagram illustrating a construction of an apparatus for forming an array antenna beam of a mobile terminal.

FIG. 8 is a block diagram illustrating a construction of an apparatus for forming an array antenna beam of a mobile terminal in accordance with another embodiment of the present invention. This apparatus includes array antennas 10-18, a modem 50, an array antenna beam controller/switch 40, and a RF unit 60. The modem sets a beam pattern toward a three-dimensional maximum signal receiving direction, sets a beam pattern based on position information of a base station and a mobile terminal, and selects an optimum beam pattern by comparing beam direction information set based on the position information with beam direction information set in the maximum signal receiving direction. The array antenna beam controller/switch 40 forms a beam pattern set in the modem by adjusting phase of the array antennas 10-18.

An RF unit 60 processes a RF (radio frequency) signal received through array antenna beam controller/switch 40.

Operation of the apparatus for forming an array antenna beam of the mobile terminal in accordance with the aforementioned embodiment of the present invention will now be described in detail. A three-dimensional beam pattern of an array antenna constructed with the smaller number of antennas can be set and formed in a maximum signal receiving direction. In addition, in accordance with the present embodiment, a beam pattern of an array antenna can be set and formed using position information of a base station broadcast periodically by the base station and position information of a mobile terminal. In addition, in accordance with the present embodiment, by comparing a three-dimensional beam pattern set based on a maximum signal receiving direction with a three-dimensional beam pattern set based on position information of a base station and a mobile terminal, an optimum beam pattern can be formed.

Figure 9:
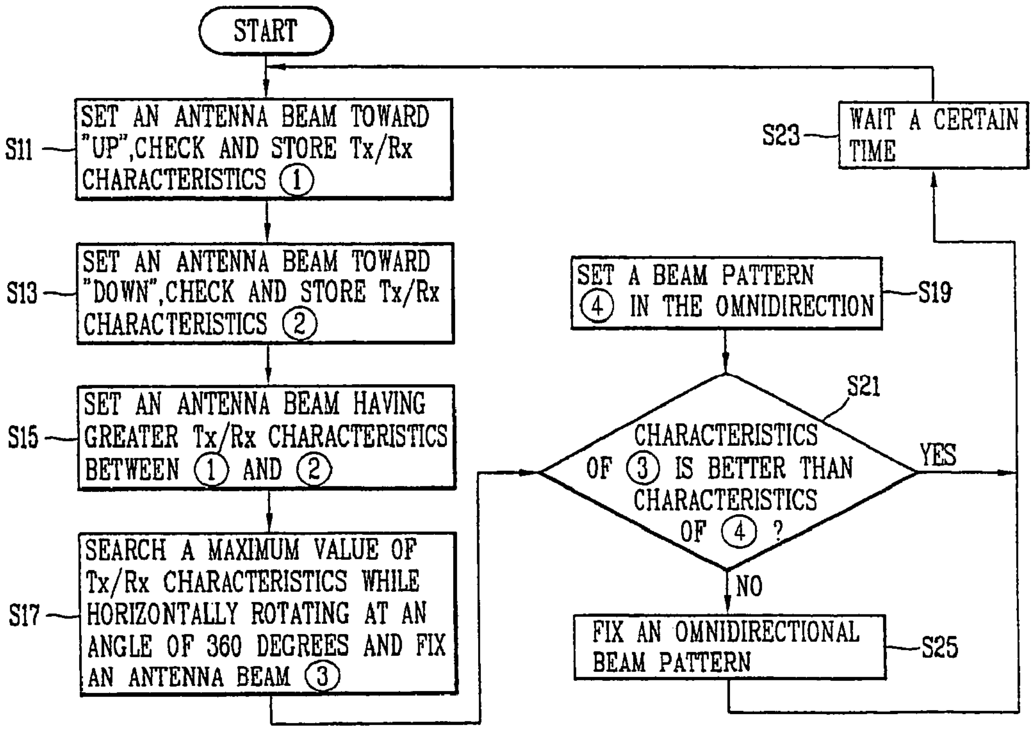
FIG. 9 is a flow chart illustrating a three-dimensional search method of an array antenna beam toward a maximum signal receiving direction.

FIG. 9 is a flow chart illustrating a three-dimensional search method of an array antenna beam toward a maximum signal receiving direction in accordance with an embodiment of the present invention. First, the mobile terminal searches a beam direction of the array antenna adaptively (steps S11~S17). More specifically, the mobile terminal sets the array antenna beams toward "up" as shown in FIG. 10A, checks and stores transmit/receive characteristics (step S11), and the mobile terminal sets the array antenna beams toward "down" as shown in FIG. 10C, checks and stores transmit/receive characteristics (step S13).

Figure 10A:
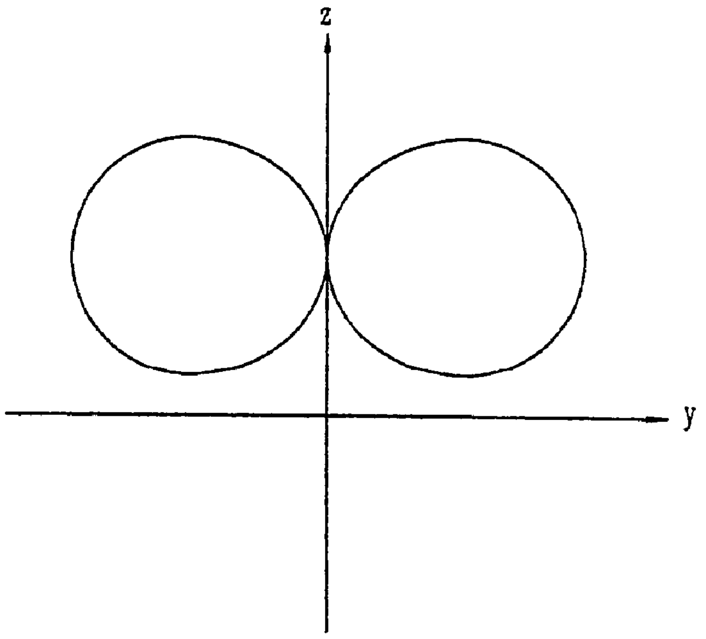
FIG. 10A illustrates an array antenna beam set toward "up."

For example, with reference to the array antenna shown in FIG. 8, the array antenna beam controller/switch 40 sets a beam in an 'up' direction as shown in FIG. 10A by adjusting phase of a signal of the antenna 10, among five antennas 10~18, positioned at an upper portion of the mobile terminal. The beam pattern set in the 'up' direction by the antenna 10 has an 8-figure shape at an upper side than the center (z=0) of a 'z' axis centering on a y-z plane.

Figure 10B:
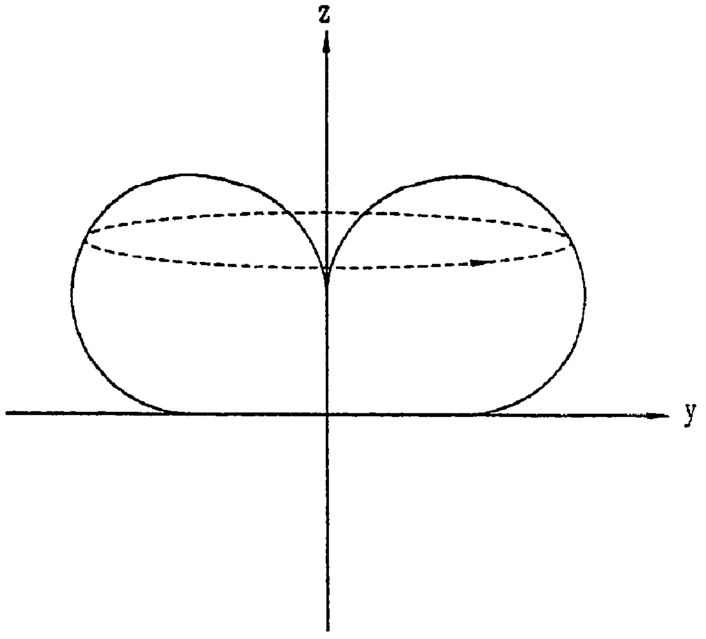
FIG. 10B illustrates the "up"-directional array antenna beam horizontally rotating at an angle of 360 degrees.
Figure 10C:
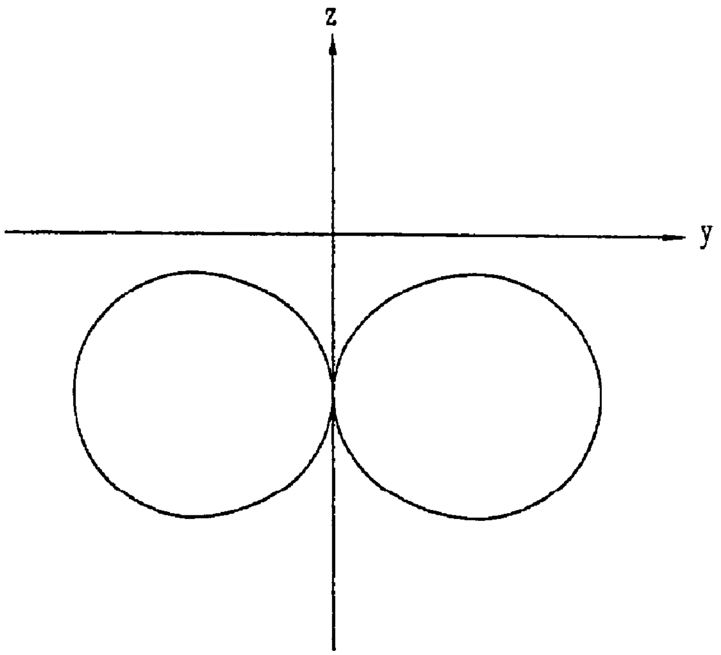
FIG. 10C illustrates an array antenna beam set toward "down."

The array antenna beam controller/switch 40 sets a beam in a 'down' direction as shown in FIG. 10C by adjusting phase of a signal of the antenna 12 positioned at a lower portion of the mobile terminal. The beam pattern set in the 'down' direction by the antenna 12 has a figure-8 shape at a lower side than the center (z=0) of the 'z' axis centering on a y-z plane.

Figure 10D:
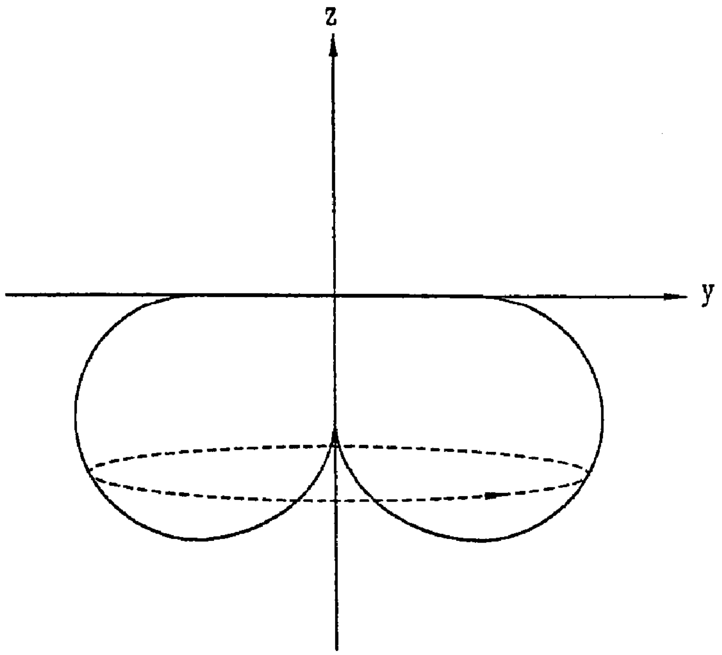
FIG. 10D illustrates the "down"-directional array antenna beam horizontally rotating at an angle of 360 degrees.

In addition, with reference to the array antenna as shown in FIG. 7, a beam in an 'up' direction can be set using load antenna 20, a beam in a 'down' direction can be set by using antenna 22, an array antenna beam having such a shape as shown in FIG. 10B can be set using antennas 20, 24, 26, 28 and 30, and an array antenna beam having such a shape as shown in FIG. 10D can be set using antennas 22, 24, 26, 28 and 30.

The transmit/receive characteristics can include transmission power, a size of a reception signal, or the like. The mobile terminal sets an array antenna beam toward a direction having a greater transmit/receive characteristics value by comparing the stored two transmit/receive characteristics with each other (step S15).

If the transmit/receive characteristics of the beam in the 'up' direction is greater than transmit/receive characteristics of the beam in the 'down' direction, the mobile terminal selects antennas 10, 14, 16 and 18 among array antennas 10~18, and searches a specific direction having a maximum transmit/receive characteristics value by rotating the three-dimensional beam formed in the 'down' direction as shown in FIG. 10D using the selected antennas 12, 14, 16 and 18.

When the specific direction having a maximum transmit/receive characteristics value is determined, the mobile terminal sets the array antenna three-dimensional beam toward that direction (step S17).

In the meantime, the mobile terminal checks and stores transmit/receive characteristics of a beam pattern set as omni-direction (step S19). In case of the array antenna shown in FIG. 6, point antenna 1 is used in omnidirectional setting of the beam, and in case of the array antenna as shown in FIG. 7 the load antenna 20 can be used.

Afterward, the mobile terminal compares transmit/receive characteristics of the beam pattern set by the adaptive array antenna with transmit/receive characteristics of the beam pattern set by the omnidirectional antenna (step S21). When transmit/receive characteristics of the adaptive array antenna are better than transmit/receive characteristics of the omnidirectional antenna, the mobile terminal maintains the beam pattern set on the basis of the adaptive array antenna (step S23).

However, when transmit/receive characteristics of the adaptive array antenna are not better than transmit/receive characteristics of the omnidirectional antenna, the mobile terminal sets a beam pattern of the omnidirectional antenna, namely, the omnidirectional beam (step S23). Accordingly, the mobile terminal can select and form a beam pattern having better transmit/receive characteristics between a three-dimensional beam pattern and an omnidirectional beam pattern.

A process for selecting a beam pattern having better transmit/receive characteristics between a three-dimensional beam pattern and an omnidirectional beam pattern is performed periodically.

In the meantime, position information of the base station and position information of the mobile terminal can be used for forming a beam. The base station periodically broadcasts position information thereof through a broadcast channel together with system information. And, the mobile terminal can obtain position information of the base station periodically through the broadcast channel.

There can be several methods for a mobile terminal to obtain this position information. In case of a mobile terminal having a GPS (Global Positioning System) unit, position information of the mobile terminal can be calculated by using the GPS unit.

In case of receiving position information from multiple base stations, the mobile terminal can calculate its position information by using the received position information of the multiple base stations.

In case that multiple base stations receive a signal of a specific mobile terminal, the multiple base stations can transmit the signal of the specific terminal and position information of each base station to a mobile switching center or to a base station controller. Then, the mobile switching center or the base station controller can calculate a position of the specific mobile terminal based on the position information of each base station and the received signal information of the mobile terminal and provide the calculated position information of the mobile terminal to the specific mobile terminal through the base station.

When the mobile terminal obtains the position information of the base station, it sets a beam direction of the array antenna based on the position information of the base station and position information of the mobile terminal, and forms a beam in the set beam direction.

Figure 11:
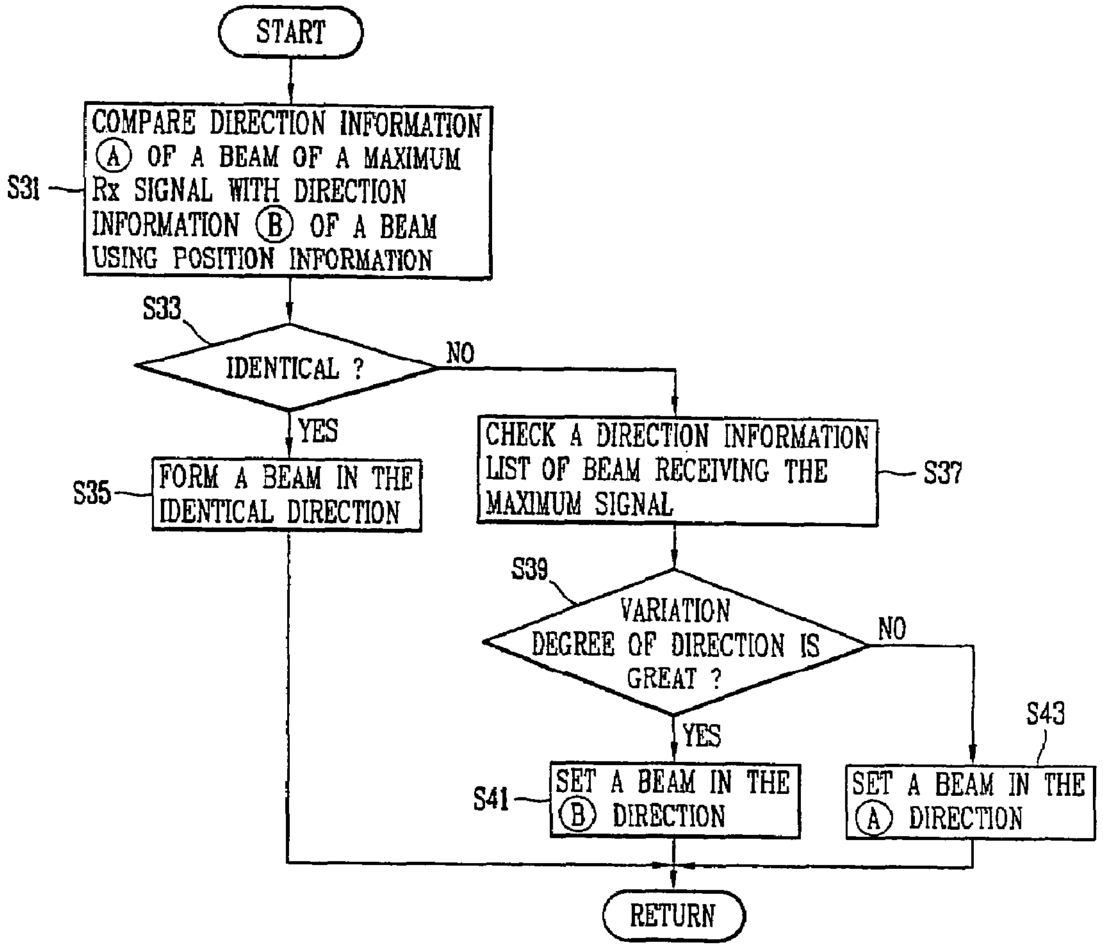
FIG. 11 is a flow chart illustrating a method for forming an array antenna beam of a mobile terminal by using a maximum signal receiving direction and position information of a base station/mobile terminal.

FIG. 11 is a flow chart illustrating steps included in a method for forming an array antenna beam of a mobile terminal by using a maximum signal receiving direction and position information of a base station/mobile terminal in accordance with one embodiment of the present invention.

The mobile terminal compares beam direction information set based on the maximum signal receiving direction shown in FIG. 11 with beam direction information set based on the position information of the base station and position information of the mobile terminal (step S31).

When the two beam direction information are the same, the mobile terminal forms a beam toward the set direction (steps S33 and S35).

However, when the two beam direction information are not the same, the mobile terminal checks a list of beam direction information set based on the maximum signal receiving direction (step S37). The list includes beam direction information set based on the maximum signal receiving direction for a certain period. Accordingly, the mobile terminal can know a variation degree of direction information set for a certain period. When the checked variation degree is large (e.g., outside a predetermined range or above a predetermined threshold), the mobile terminal finally forms a beam toward a direction set based on position information of the base station and position information of the mobile terminal (steps S39 and S41).

However, when the checked variation is not large (e.g., not within the predetermined range or below the predetermined threshold), the mobile terminal finally forms a beam toward a direction set based on a maximum signal receiving direction (step S43).

The process for selecting an optimum beam direction between an array antenna beam direction using the maximum signal receiving direction and position information of the base station/mobile terminal is performed periodically.

As described-above, in the present invention, it is possible to form a three-dimensional beam by searching a direction having a maximum transmit/receive characteristics value while rotating horizontally an “up” or “down”-directional beam at an angle of 360 degrees.

Also, by selecting an optimum beam having better transmit/receive characteristics between the adaptive beam determining a beam direction by rotating horizontally the “up” or “down”-directional beam at an angle of 360 degrees and the omnidirectional beam, it is possible to form a beam having better transmit/receive characteristics according to location such as an area having multipath and a vastly open land, etc.

Also, by forming a beam by using position information of the base station/mobile terminal, it is possible to form a beam quickly toward a direction having better transmit/receive characteristics.

Also, it is possible to select optimum beam direction information between beam direction information set toward a maximum signal receiving direction and position information of the base station/mobile terminal.

Also, by arranging an array antenna in a mobile terminal so as to have a certain three-dimensional shape, it is possible to form a three-dimensional array antenna beam with the minimum-number of antennas.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for forming an array antenna beam of a mobile terminal, comprising: comparing direction information of a first beam set toward a maximum signal receiving direction with direction information of a second beam set using position information of a base station and a mobile terminal; and selecting one of the first beam direction information or second beam direction information based on a result of the comparison, wherein the first beam direction information and the second beam direction information are different, wherein the mobile terminal includes an Omni directional antenna in addition to an array antenna, the Omni directional antenna, located at a predetermined location on the mobile terminal relative to the array antenna, and wherein the first beam direction information is determined by: determining a transmit/receive characteristic of a beam of the Omni directional antenna, comparing the transmit/receive characteristics of the array antenna and Omni directional antenna beams; and setting the first beam directional information based on a result of the comparison of the transmit/receive characteristics of the array antenna and Omni directional antenna beams.

2. The method of claim 1, further comprising: randomly selecting one of the first beam direction information or second beam direction information when the first beam direction information and the second beam direction information are at least substantially the same.

3. The method of claim 1, wherein determining the transmit/receive characteristic of the array antenna beam comprises: setting a beam in a first direction using at least a first antenna and checking and storing at least one first transmit/receive characteristic; setting a beam in a second direction using at least a second antenna and checking and storing at least one second transmit/receive characteristic; comparing the first and second transmit/receive characteristics: setting the array antenna beam toward a direction having a greater one of the first or second transmit/receive characteristics based on the comparison; and searching a direction having a maximum transmit/receive characteristics value by rotating the array antenna beam in the set direction within a predetermined range of angles.

4. The method of claim 3, wherein the array antenna beam in the set direction is horizontally rotated with an angular range of 360 degrees.

5. The method of claim 3, wherein the first direction is a ‘up’ direction and the second direction is a ‘down’ direction.

6. The method of claim 3, wherein the array antenna includes a certain number of half-wavelength di-pole antennas.

7. The method of claim 3, wherein the array antenna includes the first antenna positioned at an upper portion of the mobile terminal, the second antenna is positioned at a lower portion of the mobile terminal, and third, fourth and fifth antennas are positioned at central portions of the mobile terminal.

8. The method of claim 7, wherein the third, fourth and fifth antennas are disposed at equal intervals.

9. The method of claim 7, wherein setting the array antenna beam comprises:

setting the array antenna beam by adjusting phases of each signal of the first, third, fourth and fifth antennas, if the first transmit/receive characteristics are greater than the second transmit/receive characteristics; and setting the array antenna beam by adjusting phases of each signal of the second, third, fourth and fifth antennas, if the first transmit/receive characteristics are not greater than the second transmit/receive characteristics.

10. The method of claim 3, wherein the second antenna is positioned at a first portion of the mobile terminal, third to sixth antennas are positioned at a second portion of the mobile terminal, and the first antenna is positioned at a third portion of the mobile terminal.

11. The method of claim 10, wherein the first portion is a lower portion of the mobile terminal, the second portion is an upper portion of the mobile terminal, and the third portion is a center of a square face of the mobile terminal.

12. The method of claim 10, wherein setting the array antenna beam comprises:

setting the array antenna beam by adjusting phases of each signal of the first, third, fourth, fifth and sixth antennas, if the at least one first transmit/receive characteristic is greater than the at least one second transmit/receive characteristic; and setting the array antenna beam by adjusting phases of each signal of the second, third, fourth, fifth and sixth antennas, if the at least one first transmit/receive characteristic is not greater than the at least one second transmit/receive characteristic.

13. The method of claim 3, wherein the array antenna includes a certain number of wavelength/4 monopole antennas.

14. The method of claim 1, wherein the position information of the base station is periodically broadcast through a forward channel.

15. The method of claim 1, wherein the position information of the mobile terminal is calculated by the mobile terminal including a GPS (Global Positioning System) unit.

16. The method of claim 1, wherein the position information of the mobile terminal is calculated by the mobile terminal using base station position information received from at least one base station.

17. The method of claim 1, said selecting includes:

(a) checking a list of beam direction information in the mobile terminal, the beam direction information in said list corresponding to one or more maximum signal receiving directions set for a predetermined period of time, (b) selecting the first beam direction information when a variation degree determined as a result of said checking lies in a first predetermined range, and (c) selecting the second beam direction information when the variation degree determined as a result of said checking lies in a second predetermined range different from the second predetermined range; and forming the array antenna beam of the mobile terminal based on beam direction information selected in one of (b) or (c).

18. An apparatus for forming an array antenna beam of a mobile terminal, comprising: an array antenna; a modem for setting a first beam pattern toward a maximum three-dimensional signal receiving direction, setting a second beam pattern based on position information of a base station and a mobile terminal, and selecting one of the first beam pattern or the second beam pattern by comparing beam direction information set based on the position information with beam direction information set in the maximum signal receiving direction; an array antenna beam controller/switch which forms the selected beam pattern set in the modem by adjusting phase of the array antenna; and a RF unit for processing a RF (radio frequency) signal received through the array antenna beam controller/switch, wherein the beam direction information set in the maximum signal receiving direction indicates direction information of a beam having better transmit/receive characteristics between transmit/receive characteristics of a three-dimensional adaptive beam and transmit/receive characteristics of an Omni directional beam.

19. The apparatus of claim 18, wherein the three-dimensional adaptive beam is an adaptive beam for searching a direction having a maximum transmit/receive characteristics value by horizontally rotating an array antenna beam toward "up" or "down" at an angle of 360 degrees.

20. The apparatus of claim 18, wherein the antenna array includes a first antenna positioned at a first portion of the mobile terminal, a second antenna positioned at a second portion, and third to fifth antennas positioned at a third portion of the mobile terminal, maintaining same intervals.

21. The apparatus of claim 20, wherein the first portion is an upper portion, the second portion is a lower portion, and the third portion is a center portion of the mobile terminal.

22. The apparatus of claim 18, wherein a second antenna is positioned at a first portion of the mobile terminal, third to sixth antennas are positioned at a second portion, and a first antenna is positioned at a third portion.

23. The apparatus of claim 22, wherein the first portion is a lower portion, the second portion is an upper portion, and the third portion is a center of a square face of the mobile terminal.

24. The apparatus of claim 18, wherein the modem performs said selection by:

(a) checking a list of beam direction information in the mobile terminal, the beam direction information in said list corresponding to one or more maximum signal receiving directions set for a predetermined period of time, (b) selecting the first beam direction information when a variation degree determined as a result of (a) lies in a first predetermined range, and (c) selecting the second beam direction information when the variation degree determined as a result of (a) lies in a second predetermined range different from the second predetermined range, wherein the array antenna beam controller/switch adjusts the phase of the array antenna based on beam direction information selected in one of (b) or (c).

25. A method for forming an array antenna beam of a mobile terminal, comprising:

comparing direction information of a first beam set toward a maximum signal receiving direction with direction information of a second beam set using position information of a base station and a mobile terminal; and selecting one of the first beam direction information or second beam direction information based on a result of the comparison, wherein the first beam direction information and the second beam direction information are different, wherein the first beam direction information set toward the maximum signal receiving direction indicates direction information of a beam having better transmit/receive characteristics between transmit/receive characteristics of a three-dimensional adaptive beam and transmit/receive characteristics of an Omni directional beam.

* * * * *